(12) United States Patent
Kim et al.

(10) Patent No.: US 12,710,612 B2
(45) Date of Patent: Aug. 18, 2026

(54) OPTICAL FIBER RIBBON

(71) Applicant: LS CABLE & SYSTEM LTD., Anyang-si (KR)

(72) Inventors: Tae Gyoung Kim, Gunpo-si (KR); Young Chang Cho, Anyang-si (KR); Young Ho Jun, Gangnam-gu (KR); Man Su Lee, Chilgok-gun (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 216 days.

(21) Appl. No.: 18/580,045

(22) PCT Filed: Jul. 21, 2021

(86) PCT No.: PCT/KR2021/009442

§ 371 (c)(1),
(2) Date: Jan. 17, 2024

(87) PCT Pub. No.: WO2023/003056

PCT Pub. Date: Jan. 26, 2023

(65) Prior Publication Data

US 2024/0345355 A1 Oct. 17, 2024

(51) Int. Cl.
*G02B 6/44* (2006.01)

(52) U.S. Cl.
CPC .................................... *G02B 6/448* (2013.01)

(58) Field of Classification Search
CPC ..... G02B 6/4405; G02B 6/448; G02B 6/4403
See application file for complete search history.

(56) References Cited

U.S. PATENT DOCUMENTS 12,379,558 B2 * 8/2025 Sato ..................... G02B 6/4403
2015/0234139 A1 8/2015 Cignarale et al.
2017/0299829 A1 10/2017 Hoshino et al.
2018/0273427 A1 9/2018 Tanaka et al.
2020/0064574 A1 2/2020 Fallahmohammadi et al.
2020/0088963 A1 3/2020 Cignarale et al.
2020/0174209 A1 6/2020 Weimann et al.
2023/0123198 A1 * 4/2023 Yasutomi ............. G02B 6/4433 385/114

(Continued)

FOREIGN PATENT DOCUMENTS

CN 102057309 A 5/2011
CN 102822711 A 12/2012

(Continued)

OTHER PUBLICATIONS

Office Action for related Korean Application No. 10-2020-0089846; action dated Aug. 29, 2025; (8 pages).

(Continued)

*Primary Examiner* — Rhonda S Peace
(74) *Attorney, Agent, or Firm* — K&L Gates LLP

(57) ABSTRACT

The present disclosure relates to an optical fiber ribbon that provides a high-capacity communication network, is capable of being rolled in a width direction so as to efficiently use a space in a conduit, minimizes separation between ribbons constituting the optical fiber ribbon or damage to optical fibers during a rolling process, and facilitates overall connection or branching at a connection end.

16 Claims, 4 Drawing Sheets

(56) References Cited

U.S. PATENT DOCUMENTS

| | | | | |
|---|---|---|---|---|
| 2023/0244050 | A1* | 8/2023 | Sato | G02B 6/4404 385/114 |
| 2023/0393350 | A1* | 12/2023 | Watanabe | G02B 6/4404 |
| 2024/0319464 | A1* | 9/2024 | Ota | G02B 6/4404 |
| 2024/0329345 | A1* | 10/2024 | Hashimoto | G02B 6/02019 |

FOREIGN PATENT DOCUMENTS

| | | | | | |
|---|---|---|---|---|---|
| CN | 103890628 | A | | 6/2014 | |
| CN | 103890628 | B | * | 11/2017 | G02B 6/4404 |
| CN | 110998402 | A | | 4/2020 | |
| EP | 3812817 | A1 | | 4/2021 | |
| JP | 2013182157 | A | | 9/2013 | |
| JP | 2016061869 | A | | 4/2016 | |
| JP | 2017062431 | A | | 3/2017 | |
| KR | 1020170055956 | | | 5/2017 | |
| KR | 20200023194 | A | | 3/2020 | |
| KR | 1020200023474 | A | | 3/2020 | |
| KR | 20210145625 | A | | 12/2021 | |
| KR | 102854109 | B1 | * | 9/2025 | G02B 6/448 |
| WO | WO-2023162680 | A1 | * | 8/2023 | G02B 6/4431 |

OTHER PUBLICATIONS

Hambardzumyan; "Understanding Modulus Calculations: Young's, Chord, Tangent, and Secant Modulas"; TACTUN; Oct. 2, 2024; (6 pages).

Extended European Search Report for related European Application No. 21951004.7; action dated Mar. 21, 2025; (11 pages).

Examination Report for related Canadian Application No. 3,226,013; action dated Feb. 20, 2025; (4 pages).

International Search Report for related International Application No. PCT/KR2021/009442; action dated Jan. 26, 2023; (3 pages).

Written Opinion for related International Application No. PCT/KR2021/009442; action dated Jan. 26, 2023; (4 pages).

Office Action for related Korean Application No. 10-2020-0089846; action dated Jan. 20, 2025; (7 pages).

Office Action for related Chinese Application No. 202180100207.4; action dated Jun. 2, 2026; (7 pages).

* cited by examiner 20
20
13
10
11
d2

OPTICAL FIBER RIBBON

CROSS-REFERENCE TO RELATED APPLICATIONS

The present application is a National Stage of International Application No. PCT/KR2021/009442 filed on Jul. 21, 2021, the entire contents of each hereby incorporated by reference.

FIELD

The present disclosure relates to an optical fiber ribbon. More particularly, the present disclosure relates to an optical fiber ribbon that provides a high-capacity communication network, is capable of being rolled in a width direction so as to efficiently use a space in a conduit, minimizes separation between ribbons constituting the optical fiber ribbon or damage to optical fibers during a rolling process, and facilitates overall connection or branching at a connection end.

BACKGROUND

In order to build a large-capacity optical communication network, an optical fiber ribbon formed by bonding optical fibers in parallel to each other may be used.

The optical fiber ribbon, in which a plurality of optical fibers is integrally bonded to each other in parallel using a resin, is generally manufactured in a strip shape, and optical fiber ribbons are stacked to form a ribbon stack having the shape of a polygonal column.

The optical fiber ribbon is mainly used for large-capacity optical communication networks due to the advantage of overall connection for each optical fiber ribbon at a connection end.

In general, when a plurality of tubes (or microtubes) is pre-installed in a conduit in order to build an optical communication network and an optical cable including a strip-shaped optical fiber ribbon or an optical fiber ribbon stack in the form of polygonal columns is laid in each tube, which is generally circular in section, the utilization of a space in the tube installed in the conduit is not high. In addition, it is preferable for a circular optical cable or optical unit to have a larger number of optical fiber core wires that can be received within the same sectional area.

In order to increase the utilization of a space in a tube installed in a conduit used to build an optical communication network or to increase the number of optical fiber core wires that can be received in an optical cable or an optical unit, a rollable optical fiber ribbon that can be deformed into a cylindrical shape by rolling an optical fiber ribbon in a width direction has been introduced.

The rollable optical fiber: ribbon must satisfy various conditions, such as that optical fibers bonded to each other in a rolled state, which constitute the optical fiber ribbon, must not be easily separated from each other such that the shape of the optical fiber ribbon is maintained, that, when the rolled state is released at a connection end, the shape of the optical fiber ribbon must be restored into the form of a general strip for overall connection, that, when it is necessary to separate individual optical fibers from each other during a connection process, the individual optical fibers must be easily separated from each other, and that damage to the optical fibers must be prevented during a separation process.

SUMMARY

It is an object of the present disclosure to provide an optical fiber ribbon that provides a high-capacity communication network, is capable of being rolled in a width direction so as to efficiently use a space in a conduit, minimizes separation between ribbons constituting the optical fiber ribbon or damage to optical fibers during a rolling process, and facilitates overall connection or branching at a connection end.

To achieve these objects, the present disclosure provides an optical fiber ribbon formed by bonding a plurality of optical fibers in parallel to each other, wherein each pair of adjacent optical fibers among the plurality of optical fibers is bonded to each other through a plurality of bonding parts disposed at predetermined intervals in a longitudinal direction of the optical fiber, and in the longitudinal direction of the optical fiber, a length of each of the bonding parts is 5 mm to 15 mm, a period of the bonding parts is 10 mm to 90 mm, and a length of a non-bonding part is 5 mm to 75 mm.

And the length of the bonding part may be preferably 13.5 mm to 15 mm, the period of the bonding parts may be preferably 50 mm to 70 mm, and the length of the non-bonding part may be preferably 33.5 mm to 55 mm.

And a longitudinal length of the optical fiber ribbon in a non-bonding region that is not bonded by the bonding part in a width direction of the optical fiber ribbon may be 0 mm to 30 mm.

And the longitudinal length (b) of the optical fiber ribbon in the non-bonding region may be preferably 10 mm to 20 mm.

And the optical fiber ribbon may include N optical fibers, and a position of a bonding part configured to bond an n-th optical fiber (n being a natural number equal to or greater than 1) and an (n+1)-th optical fiber among the N optical fibers in the longitudinal direction of the optical fiber may be located in a middle between positions of bonding parts configured to bond the (n+1)-th optical fiber and an (n+2)-th optical fiber (n+2 being a natural number equal to or less than N) in the longitudinal direction.

And an upper part and/or a lower part of the bonding part may be bonded to each other in a state in which a pair of optical fibers to be bonded is circumscribed, or a pair of optical fibers may be bonded to each other at the bonding part in a state in which the pair of optical fibers is spaced apart from each other.

And when each optical fiber has a diameter of 230 μm to 270 μm, the number of the bonding parts where the optical fibers are bonded to each other in a circumscribed state, among the plurality of bonding parts, may be greater than the number of the bonding parts where the optical fibers are bonded to each other in a state of being spaced apart from each other.

And when each optical fiber has a diameter of 180 μm to 220 μm, the number of the bonding parts where the optical fibers are bonded to each other in a state of being spaced apart from each other, among the plurality of bonding parts, may be greater than the number of the bonding parts where the optical fibers are bonded to each other in a circumscribed state.

And a resin constituting each bonding part may have an elongation of 120% to 250% in a cured or sintered state.

And a resin constituting each bonding part may have a secant modulus of 1 MPa to 200 MPa at 2.5% strain in a cured or sintered state.

And each bonding part may be formed using a general application method of a resin, and the resin used in the general application method has a viscosity of 4,000 mPa·s to 6,000 mPa·s at 25° C.

And the general application method may be a roller application method using a roller having a resin injection portion and formed in a shape that enables periodic resin injection.

And each bonding part may be formed using a precision application method of a resin, and the resin used in the precision application method has a viscosity of 500 mPa·s to 1,500 mPa·s at 25° C.

And the precision application method may be a dispenser application method using a dispenser.

And a resin constituting each bonding part may have a tensile strength of 5 MPa to 25 MPa.

And when a coupling rate is defined as an equation below for the period (P) of the bonding parts, which is a sum of the length (a) of each bonding part and the length (c) of the non-bonding part, the coupling rate may be 5% to 50%.

—Below—

$$\text{Coupling rate} = \frac{\sum \text{length } (a) \text{ of bonding part}}{\sum \text{period } (P) \text{ of bonding parts}} \times 100\ [\%]$$

And the coupling rate may be more preferably 19% to 30%.

And a rolled optical fiber ribbon formed by rolling the optical fiber ribbon, wherein at least one optical fiber constituting the optical fiber ribbon may comprise at least one optical fiber disposed in a state of not being bonded to at least one optical fiber to be bonded.

According to the present disclosure, it is possible to provide an optical fiber ribbon that provides a high-capacity communication network, is capable of being rolled in a width direction in order to reduce the outer diameter of a cable so as to efficiently use a space in a conduit, minimizes separation between ribbons constituting the optical fiber ribbon or damage to optical fibers during a rolling process, and facilitates overall connection or branching at a connection end.

DETAILED DESCRIPTION

Hereinafter, preferred embodiments of the present disclosure will be described in detail with reference to the accompanying drawings. However, the present disclosure is not limited to the embodiments described herein, and may be embodied in various different forms. Rather, these embodiments are provided such that the present disclosure will be thorough and complete, and will fully convey the scope of the present disclosure to those skilled in the art. The same reference numbers denote the same elements throughout the specification.

Figure 1:
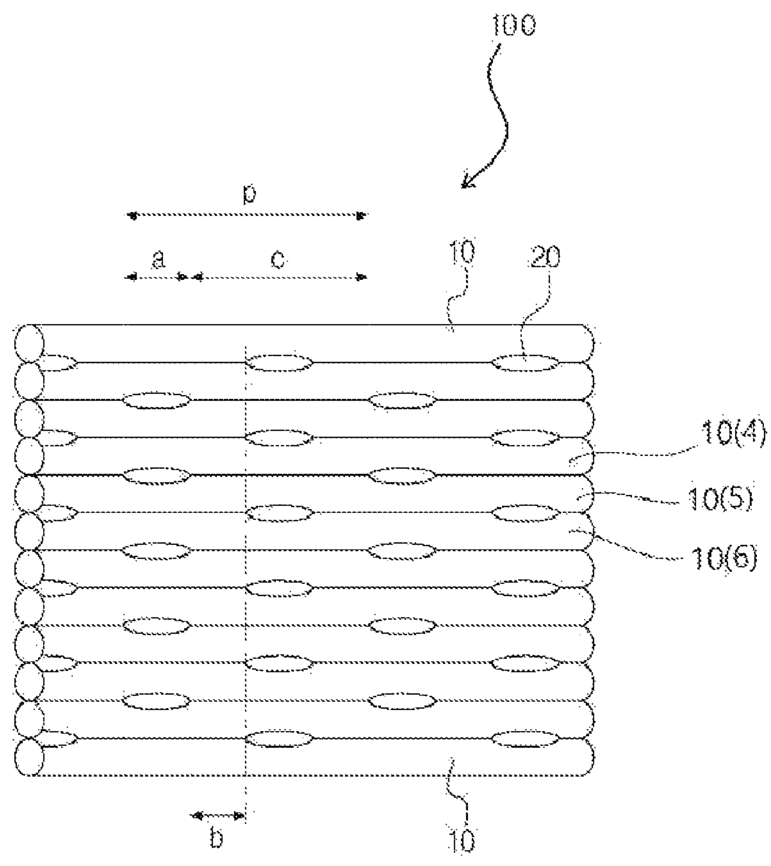
FIG. 1 is a plan view of an optical fiber ribbon according to the present disclosure.
Figure 2:
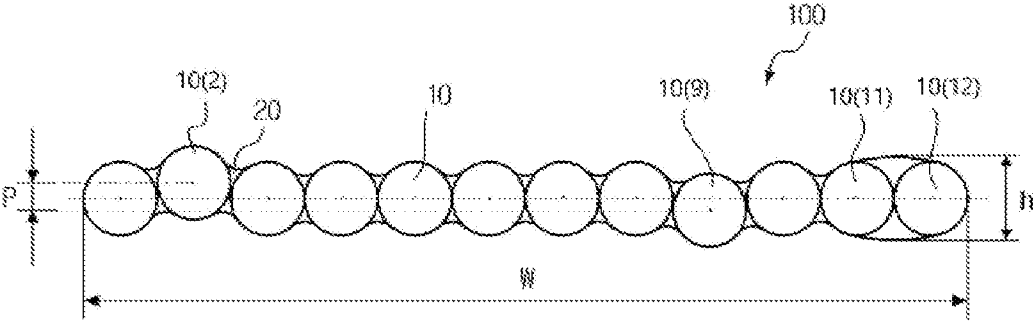
FIG. 2 is a sectional view of an embodiment of the optical fiber ribbon shown in FIG. 1.

FIG. 1 is a plan view of an optical fiber ribbon 100 according to the present disclosure, and FIG. 2 is a sectional view of an embodiment of the optical fiber ribbon 100 shown in FIG. 1.

The present disclosure provides an optical fiber ribbon 100 formed by bonding a plurality of optical fibers in parallel to each other, wherein each pair of adjacent optical fibers among the plurality of optical fibers 10 is bonded to each other through a plurality of bonding parts 20 disposed at predetermined intervals in a longitudinal direction of the optical fiber, the length a of each of the bonding parts 20 in the longitudinal direction of the optical fiber 10 is 5 mm to 15 mm, the period P of the bonding parts 20 is 10 mm to 90 mm, and the length c of a non-bonding part 20 is 5 mm to 75 mm.

In general, the optical fiber ribbon 100 refers to an optical unit formed in the shape of a strip by sequentially bonding the plurality of optical fibers 10 in parallel to each other.

That is, the optical fibers 10 disposed adjacent in parallel are bonded to each other at the interface therebetween in the longitudinal direction using a resin to form the optical fiber ribbon 100, and furthermore a plurality of optical fiber ribbons 100 is stacked to form a ribbon stack, which is used to construct a large-scale optical communication network in a form that can be connected at once. In order to solve the problem that efficiently using a space in a tube or a cable of a conduit with a conventional optical fiber ribbon 100 or ribbon stack is difficult, however, the present disclosure is configured such that a bonding method is changed, whereby the optical fiber ribbon can be rolled in a width direction, unlike the conventional optical fiber ribbon 100.

When forming an optical fiber ribbon that is capable of being rolled in the width direction, each optical fiber constituting the optical fiber ribbon may be bonded to an optical fiber adjacent thereto, through a bonding part, or may be disposed in simple contact with an optical fiber adjacent thereto in an unbonded state, resulting in an optical fiber bundle of various shapes with minimal empty space, whereby a cable including the optical fiber ribbon may have a large number of optical fiber cores in a limited space in a sheath or a tube such that the space in the tube or the optical cable can be efficiently used when laying the cable.

In order to secure flexibility to enable rolling of the optical fiber ribbon 100 in the width direction, the present disclosure is configured such that the bonding parts 20 configured to bond adjacent optical fibers 10 to each other are not formed over the entirety of the interface between the optical fibers 10 but the bonding parts 20 configured to bond a pair of adjacent optical fibers 10 to each other are discontinuously disposed along the interface between the pair of optical fibers 10, as shown in FIG. 1.

That is, the bonding strength of the bonding parts 20 configured to bond the optical fibers 10 to each other is reduced such that the optical fiber ribbon 100 can be rolled in the width direction. As the size of each bonding part 20 decreases and the frequency of the bonding parts 20 is lowered, it becomes easier to roll the optical fiber ribbon 100 in the width direction in order to minimize the volume of the optical fiber ribbon. During a rolling process, however, the optical fibers 10 may be separated from each other, and separated optical fibers 10 may be damaged during an installation process of the optical fiber ribbon 100.

Conversely, if the size and frequency of the bonding parts 20 are increased in order to prevent separation between the optical fibers 10, the optical fiber ribbon 100 may not easily be rolled, or when a specific optical fiber 10 that is not connected at once needs to be branched from a connection end or a branch end, the optical fiber 10 may be damaged during a process of branching the optical fibers 10, or a large amount of a resin may remain on the branched optical fiber 10, whereby the optical fiber 10 may not be cleanly branched.

In the present disclosure, therefore, a method of optimizing the length, interval, or period of each bonding part 20 or the width of a non-bonding region in the width direction is used in order to enable rolling in the width direction, to prevent separation between the optical fibers 10 during the rolling process, and to prevent damage to a specific optical fiber 10 while facilitating branching when branching the optical fiber 10.

Specifically, the present disclosure is configured such that the length a of each bonding part 20 configured to bond a pair of adjacent optical fibers 10 to each other in the longitudinal direction of the optical fiber 10 is 5 mm to 15 mm, the period P of the bonding parts 20 is 10 mm to 90 mm, and the length c of the non-bonding part 20 is 5 mm to 75 mm.

That is, a pair of adjacent optical fibers 10 is not entirely bonded to each other in the longitudinal direction, bonding parts 20 each having a length a of 5 mm to 15 mm are formed at intervals of 10 mm to 90 mm, and a non-bonding part 20 that is not bonded to the bonding part 20 is formed so as to have a length c of 5 mm to 75 mm, whereby rolling in the width direction is possible while preventing the problem that the optical fibers 10 are separated during the rolling process.

In the length limitations, if, among the length a of the bonding part 20 in the longitudinal direction of the optical fiber 10, the period P of the bonding parts 20, and the length c of the non-bonding part 20, the length a of the bonding part 20 in the longitudinal direction of the optical fiber is less than the above range and the period P of the bonding parts 20 and the length c of the non-bonding part 20 are greater than the above ranges accordingly, rolling is possible, but a plurality of bonding parts 20 is damaged and the optical fibers 10 are separated from each other. If the length a of the bonding part 20 in the longitudinal direction of the optical fiber is greater than the above range and the period P of the bonding parts 20 and the length c of the non-bonding part 20 are less than the above ranges accordingly, rolling is not easy, and the optical fibers 10 are damaged during the rolling process or branching of a specific optical fiber 10 is not easy.

In the embodiment shown in FIG. 1, the longitudinal length b of the optical fiber ribbon 100 in the non-bonding region that is not bonded by the bonding part 20 in the width direction of the optical fiber ribbon 100 may be configured to be about 0 mm to 30 mm, which is advantageous in securing flexibility for rolling in the width direction.

When the optical fiber ribbon is composed of N optical fibers, as shown in FIG. 1, the position of a bonding part 20 configured to bond an n-th optical fiber 10 (n being a natural number equal to or greater than 1) and an (n+1)-th optical fiber 10, among the N optical fibers 10, to each other in the longitudinal direction of the optical fiber 10 is located in the middle between the positions of two continuous bonding parts 20 configured to bond the (n+1)-th optical fiber 10 and an (n+2)-th optical fiber 10 (n+2 being a natural number equal to or less than N) to each other in the longitudinal direction, whereby it is possible to equalize the longitudinal length b of the optical fiber ribbon 100 in the non-bonding region in the width direction of the optical fiber ribbon 100, and therefore it is possible to secure uniform width flexibility over the entire position in the longitudinal direction.

In the embodiment shown in FIG. 1, the optical fiber ribbon 100 includes 12 optical fibers, wherein, for example, the position of a plurality of spaced apart bonding parts configured to bond a fourth optical fiber (an n-th optical fiber, n=4) 10(4) and a fifth optical fiber (an (n+1)-th optical fiber) 10 to each other is located in the middle between a plurality of spaced apart bonding parts configured to bond the fifth optical fiber (the (n+1)-th optical fiber) 10(5) and a sixth optical fiber (an (n+2)-th optical fiber) 10(6) to each other, whereby the longitudinal length b of the optical fiber ribbon 100 in the non-bonding region in the width direction of the optical fiber ribbon 100 may be uniformly minimized in the longitudinal direction of the optical fiber ribbon 100.

Conversely, when the position of a bonding part 20 configured to bond an n-th optical fiber 10 (n being a natural number equal to or greater than 1) and an (n+1)-th optical fiber 10, among the N optical fibers 10, to each other in the longitudinal direction of the optical fiber 10 is identical to the position of a bonding part 20 configured to bond the (n+1)-th optical fiber 10 and an (n+2)-th optical fiber 10 (n+2 being a natural number equal to or less than N) to each other in the longitudinal direction, rolling may be difficult in the bonding region where the bonding parts 20 configured to bond the optical fibers 10 to each other are disposed in the width direction, and the length of the non-bonding region in the width direction of the optical fiber ribbon 100 may be increased, whereby it may be difficult to roll the optical fiber ribbon 100 into a pipe shape.

Thus, it is more preferable for bonding parts 20 configured to bond a pair of optical fibers 10 to each other to be uniformly spaced apart from each other in the longitudinal direction and for bonding parts 20 configured to bond adjacent pairs of optical fibers 10 to each other to be staggered in the longitudinal direction.

When the length a of each bonding part 20 configured to bond the optical fibers 10 to each other in the longitudinal direction of the optical fiber 10 is 5 mm to 15 mm, the period P of the bonding parts 20 is 10 mm to 90 mm, and the length c of the non-bonding part 20 is 5 mm to 75 mm, rolling in the width direction is possible, and the problem that the optical fibers (10) are separated during the rolling process may be minimized. Preferably, the length a of each bonding part 20 in the longitudinal direction of the optical fiber 10 is 13.5 mm to 15 mm, the period P of the bonding parts 20 is 50 mm to 70 mm, and the length c of the non-bonding part 20 is 33.5 mm to 55 mm. In this case, optimal rolling performance may be achieved, and damage to the bonding parts 20 or the optical fibers 10 may be minimized.

In addition, when the length a of each bonding part 20 in the longitudinal direction of the optical fiber 10 is 13.5 mm to 15 mm, the period P of the bonding parts 20 is 50 mm to 70 mm, the length c of the non-bonding part 20 is 33.5 mm to 55 mm, and the longitudinal length b of the optical fiber ribbon 100 in the non-bonding region is 10 mm to 20 mm, it is possible to provide optimum flexibility in forming the optical fiber ribbon 100 using the same number of bonding parts 20 having the same length.

In order to secure flexibility and stable bonding performance of the optical fiber ribbon, the coupling rate, which is the ratio of the sum of the lengths a of the bonding parts in the longitudinal direction of the optical fiber ribbon to the sum of periods P of the bonding parts, which is the sum of the length a of the bonding part and the length c of the non-bonding part, in the longitudinal direction of the optical fiber ribbon, is 5% to 50%, preferably 19% to 30%.

That is, when the coupling rate, which is the ratio of the bonding length of a pair of adjacent optical fibers to the total length of the optical fiber ribbon, is less than 5%, flexibility is sufficient, but some bonding parts are easily separated during the process of rolling the optical fiber ribbon or during stretching the optical fiber ribbon into a flat shape for connection at the connection end, whereby stable bonding performance is not provided, and when the coupling rate is 50% or more, sufficient flexibility to roll the optical fiber ribbon is not secured. More preferably, therefore, the appropriate compromise between flexibility and bonding performance is determined in the range of 19% to 30%.

Even though the length a of the bonding part, and the length c of the non-bonding part, and the period P of the bonding parts are variously changed within the above ranges, therefore, it is preferable to set the coupling rate below within the range of 5% to 50%, preferably 19% to 30%.

—Below—

$$\text{Coupling rate} = \frac{\sum \text{length } (a) \text{ of bonding part}}{\sum \text{period } (P) \text{ of bonding parts}} \times 100\ [\%]$$

Each of the optical fibers 10 constituting the optical fiber ribbon 100 shown in FIGS. 1 and 2 may be a small-diameter optical fiber having a diameter of 180 μm to 220 μm or an ordinary optical fiber having a diameter of 230 μm to 270 μm, and when 12 optical fibers are bonded to form the optical fiber ribbon 100, the width (W) of the optical fiber ribbon 100 may be configured to be 3.22 mm or less, which is a limit based on IEC standards or ANSI/ICEA standards related to optical cables.

In the optical fiber ribbon 100, ideally, the plurality of optical fibers 10 is bonded such that the centers of the optical fibers 10 are disposed on the same axis based on the section shown in FIG. 2; however, errors may occur during the bonding process, and even when such errors occur, the deviation in height between the centers of adjacent optical fibers 10 constituting the optical fiber ribbon 100 is preferably minimized to provide optimal rolling performance.

In the embodiment shown in FIG. 2, among the 12 optical fibers 10 constituting the optical fiber ribbon 100, a second optical fiber 10(2) and a ninth optical fiber 10(9) are bonded above or below a reference height, respectively; however, the center-to-center height difference p between the second optical fiber 10(2) and the ninth optical fiber 10(9) must be 75 μm or less, which is less than the radius of each optical fiber 10, based on the IEC standards or ANSI/ICEA standards related to optical cables.

When an appropriate amount of resin is used, the bonding parts 20 may be cured into an inwardly curved shape, like the bonding parts 20 shown in FIG. 2. When the amount of the resin is not controlled and an excessive amount of the resin is injected, however, the bonding part may be cured in an outwardly curved shape, like the bonding part 20 configured to bond an 11th optical fiber 10(11) and a 12th optical fiber 10(12) to each other shown in FIG. 2. Even though the bonding part 20 protrudes outwardly from the optical fiber 10, as described above, the maximum thickness h of the bonding part 20 must be 360 μm or less, which is a limit based on IEC standards or ANSI/ICEA standards related to optical cables.

The bonding part 20 of the optical fiber ribbon 100 according to the present disclosure may be formed by UV curing or laser sintering various resins, such as a UV curable resin or laser sintered powder; however, it is necessary to have at least the following physical properties in a cured or sintered state such that the optical fiber ribbon can be rolled in the width direction while separation between the optical fibers is minimized during the rolling process, which has been confirmed through repeated experiments.

That is, the bonding 20 is required to have a higher elongation than a bonding part 20 using a conventionally used resin in order to allow rolling of the optical fiber ribbon, and specifically, the cured or sintered resin is required to have an elongation of at least 100%. Preferably, an elongation of 120% to 250% is advantageous for ribbon rolling characteristics.

In addition, the material is preferably selected such that secant modulus of the cured or sintered resin is about 1 MPa to 200 MPa at 2.5% strain, whereby the bonding part 20 has lower secant modulus than a bonding part 20 composed of a conventionally used resin, and therefore rolling in the width direction is possible or the rolling state can be maintained. Unless the surface of the resin is sticky after curing, the lower the secant modulus, the better the ribbon properties. However, balance between the secant modulus and the elongation must be achieved.

Accurate and rapid application of the resin must be performed to form the plurality of optical fibers 20 spaced apart from each other in the longitudinal direction of the optical fiber, and the viscosity of the resin may have a limited range of values depending on a method used at the time of manufacture in order to achieve adequate flowability to prevent dripping prior to curing or sintering. A resin used in a roller application method using a roller, which is a common application method, has a viscosity of 4,000 mPa·s to 6,000 mPa·s at 25° C., but for a dispenser application method, which uses a dispenser for precision application, the viscosity of the resin is preferably in the range of 500 mPa·s to 1,500 mPa·s.

The roller application method is a method using a roller having a resin injection portion and formed in a shape that enables periodic resin injection.

In addition, it is preferable to have a tensile strength of 5 MPa to 25 MPa in order to return the rolled ribbon to the original flat shape for overall connection.

Figure 3:
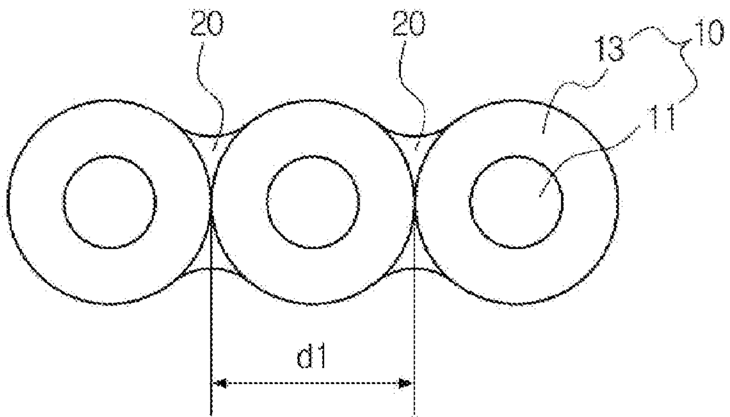
FIG. 3 is an enlarged sectional view of a principal part of an embodiment of the optical fiber ribbon according to the present disclosure.
Figures 4, 5:
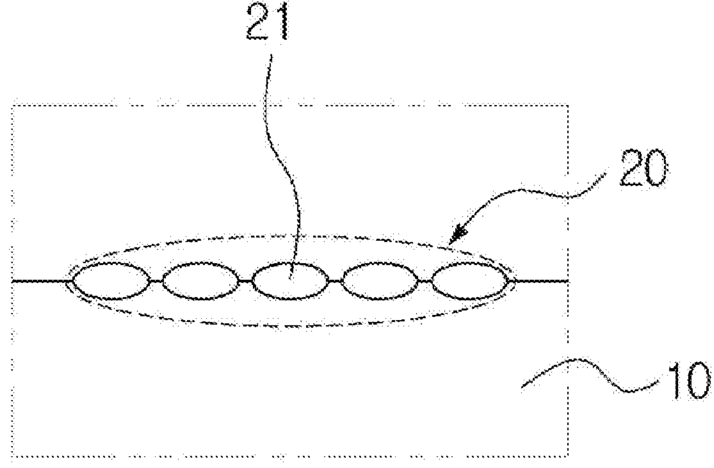
FIG. 4 is an enlarged sectional view of a principal part of another embodiment of the optical fiber ribbon according to the present disclosure.
FIGS. 5 and 6 are enlarged views of bonding parts of other embodiments of the optical fiber ribbon according to the present disclosure.

FIG. 3 is an enlarged sectional view of a principal part of an embodiment of the optical fiber ribbon 100 according to the present disclosure, and FIG. 4 is an enlarged sectional view of a principal part of another embodiment of the optical fiber ribbon according to the present disclosure.

Specifically, the embodiment shown in FIG. 3 may be a general optical fiber ribbon 100 in which each optical fiber 10 constituting the optical fiber ribbon 100 has a diameter of 230 μm to 270 μm, and the embodiment shown in FIG. 4 may be a small-diameter optical fiber ribbon 100 in which each optical fiber 10 constituting the optical fiber ribbon 100 has a diameter of 180 μm to 220 μm.

Here, each optical fiber 10 constituting the optical fiber ribbon 100 may include a glass core 11 and a clad layer 13 configured to wrap the glass core, the clad layer being cured using a UV curable resin.

The optical fiber ribbon 100 shown in FIG. 3 is formed by bonding 12 general optical fibers 10 to each other, and therefore most of the adjacent optical fibers 10 must be bonded to each other in a circumscribed state, as shown in FIG. 2 or 3, since there is a limit to the width W of the 12-core optical fiber ribbon 100 of 3.22 mm (3,220 μm)

based on the IEC standards or ANSI/ICEA standards related to optical fiber ribbons or fibers.

That is, since the sum of the diameters of the 12 optical fibers 10 each having a diameter of 250 μm is 3,000 μm, most of the optical fibers 10 must be bonded to each other in a circumscribed state to form the bonding part 20 even though some of the optical fibers 10 are bonded to each other in a state of being spaced apart from each other (see FIG. 4).

For the general optical fibers 10, therefore, the number of the bonding parts 20 where the optical fibers 10 are bonded to each other in a circumscribed state, among the plurality of bonding parts 20, may be greater than the number of the bonding parts 20 where the optical fibers 10 are bonded to each other in a state of being spaced apart from each other.

On the other hand, the optical fiber ribbon 100 shown in FIG. 4 is formed by bonding 12 small-diameter optical fibers 10 to each other, and the sum of diameters of the optical fibers is merely a maximum of 2,640 μm, which is less than 3.22 mm (3, 220 μm), which is a limit of the width of the 12-core optical fiber ribbon 100.

When the optical fibers 10 are discontinuously bonded to each other to form the optical fiber ribbon 100, bonding performance may be better when the optical fibers 10 are bonded to each other using a resin in a state of being spaced apart from each other to form the bonding parts 20, as shown in FIG. 4, than when the optical fibers 10 are bonded to each other in a circumscribed state. That is, when the optical fiber ribbon 100 is formed by bonding the 12 small-diameter optical fibers 10 to each other, the bonding parts 20 may be formed in the state in which most of the optical fibers 10 are spaced apart from each other.

For the small-diameter optical fibers 10, therefore, the number of the bonding parts 20 where the optical fibers 10 are bonded to each other in a state of being spaced apart from each other, among the plurality of bonding parts 20, may be greater than the number of the bonding parts 20 where the optical fibers 10 are bonded to each other in a circumscribed state.

In summary, it is possible to determine whether to bond the optical fibers 10 to each other in a circumscribed state or whether to bond the optical fibers 10 to each other in a state of being spaced apart from each other in consideration of the diameter of the optical fibers 10 and the width limitations of the optical fiber ribbon 100.

Figure 6:
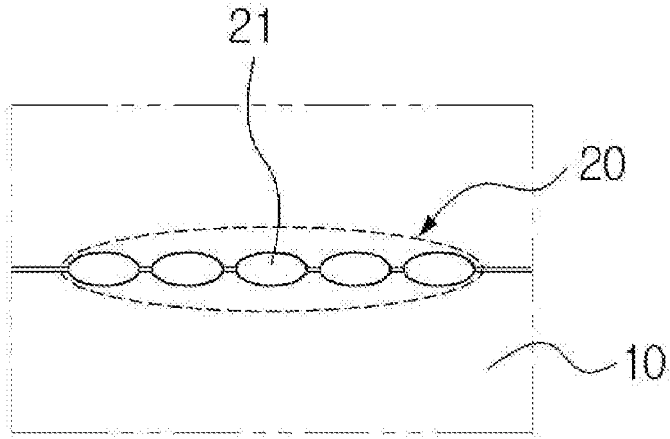

FIGS. 5 and 6 are enlarged views of bonding parts 20 of other embodiments of the optical fiber ribbon 100 according to the present disclosure.

While the foregoing embodiments are examples in which one bonding part 20 configured to bond a pair of optical fibers 10 to each other is configured as a resin-filled form, one bonding part 20 may include a plurality of adhesion points 21.

That is, in the example shown in FIG. 5, a pair of optical fibers 10 is connected to each other in a circumscribed state, and one bonding part 20 configured to bond the pair of circumscribed optical fibers 10 to each other includes five adhesion points 21, whereby the amount of resin that fills one bonding part 20 may be reduced, whereby greater flexibility may be provided. Even though the amount of resin is reduced to improve flexibility, the longitudinal length b of the optical fiber ribbon 100 in the non-bonding region that is not bonded by the bonding part 20 in the width direction of the optical fiber ribbon 100 may be kept approximately the same.

In addition, as shown in FIG. 6, one bonding 20 may include a plurality of adhesion points 21, and optical fibers 10 may be bonded to each other in a state of being minutely spaced apart from each other. Even when the diameter of the optical fiber 10 is relatively large and there is a width limit of the optical fiber ribbon 100, as described above, the optical fibers 10 may be bonded to each other in the state in which the optical fibers are minutely spaced apart from each other such that a plurality of adhesion points constitutes one bonding part, since the size or volume of the adhesion points 21 is less than that of each bonding part 20. In this case, it is possible to further improve flexibility of the bonding parts 20 along with bonding stability.

Although preferred embodiments of the present disclosure have been described in this specification, those skilled in the art will appreciate that various changes and modifications are possible without departing from the idea and scope of the present disclosure recited in the appended claims. Therefore, it should be understood that such changes and modifications fall within the technical category of the present disclosure as long as the changes and modifications include elements described in the claims of the present disclosure.

The invention claimed is:

1. An optical fiber ribbon formed by bonding a plurality of optical fibers in parallel to each other, wherein each pair of adjacent optical fibers among the plurality of optical fibers is bonded to each other through a plurality of bonding parts disposed at predetermined intervals in a longitudinal direction of the optical fiber, and in the longitudinal direction of the optical fiber, a length of each of the bonding parts is 5 mm to 15 mm, a period of the bonding parts is 10 mm to 90 mm, and a length of a non-bonding part is 5 mm to 75 mm, wherein the period (P) of the bonding parts is a sum of the length (a) of each bonding part and the length (c) of the non-bonding part, wherein a coupling rate is given by:

$$\text{Coupling rate} = \frac{\sum \text{length } (a) \text{ of bonding part}}{\sum \text{period } (P) \text{ of bonding parts}} \times 100\ [\%]$$

and wherein the coupling rate is 19% to 30%.

2. The optical fiber ribbon according to claim 1, wherein the length of each bonding part is 13.5 mm to 15 mm, the period of the bonding parts is 50 mm to 70 mm, and the length of the non-bonding part is 33.5 mm to 55 mm.

3. The optical fiber ribbon according to claim 1, wherein a longitudinal length of the optical fiber ribbon in a non-bonding region that is not bonded by the bonding part in a width direction of the optical fiber ribbon is 0 mm to 30 mm.

4. The optical fiber ribbon according to claim 3, wherein the longitudinal length (b) of the optical fiber ribbon in the non-bonding region is 10 mm to 20 mm.

5. The optical fiber ribbon according to claim 1, wherein the optical fiber ribbon includes N optical fibers, and a position of a bonding part configured to bond an n-th optical fiber (n being a natural number equal to or greater than 1) and an (n+1)-th optical fiber among the N optical fibers in the longitudinal direction of the optical fiber is located in a middle between positions of bonding parts configured to bond the (n+1)-th optical fiber and an (n+2)-th optical fiber (n+2 being a natural number equal to or less than N) in the longitudinal direction.

6. The optical fiber ribbon according to claim 1, wherein an upper part and/or a lower part of the bonding part are bonded to each other in a state in which a pair of optical fibers to be bonded is circumscribed, or a pair of optical fibers is bonded to each other at the bonding part in a state in which the pair of optical fibers is spaced apart from each other.

7. The optical fiber ribbon according to claim 6, wherein when each optical fiber has a diameter of 230 μm to 270 μm, the number of the bonding parts where the optical fibers are bonded to each other in a circumscribed state, among the plurality of bonding parts, is greater than the number of the bonding parts where the optical fibers are bonded to each other in a state of being spaced apart from each other.

8. The optical fiber ribbon according to claim 6, wherein when each optical fiber has a diameter of 180 μm to 220 μm, the number of the bonding parts where the optical fibers are bonded to each other in a state of being spaced apart from each other, among the plurality of bonding parts, is greater than the number of the bonding parts where the optical fibers are bonded to each other in a circumscribed state.

9. The optical fiber ribbon according to claim 1, wherein a resin constituting each bonding part has an elongation of 120% to 250% in a cured or sintered state.

10. The optical fiber ribbon according to claim 1, wherein a resin constituting each bonding part has a secant modulus of 1 MPa to 200 MPa at 2.5% strain in a cured or sintered state.

11. The optical fiber ribbon according to claim 1, wherein each bonding part is formed using a general application method of a resin, and the resin used in the general application method has a viscosity of 4,000 mPa·s to 6,000 mPa·s at 25° C.

12. The optical fiber ribbon according to claim 11, wherein the general application method is a roller application method using a roller having a resin injection portion and formed in a shape that enables periodic resin injection.

13. The optical fiber ribbon according to claim 1, wherein each bonding part is formed using a precision application method of a resin, and the resin used in the precision application method has a viscosity of 500 mPa·s to 1,500 mPa·s at 25° C.

14. The optical fiber ribbon according to claim 13, wherein the precision application method is a dispenser application method using a dispenser.

15. The optical fiber ribbon according to claim 1, wherein a resin constituting each bonding part has a tensile strength of 5 MPa to 25 MPa.

16. A rolled optical fiber ribbon formed by rolling the optical fiber ribbon according to any one of claims 1 to 15, wherein at least one optical fiber constituting the optical fiber ribbon comprises at least one optical fiber disposed in a state of not being bonded to at least one optical fiber to be bonded.

* * * * *